(12) United States Patent
Sacher

(10) Patent No.: US 8,693,077 B2
(45) Date of Patent: Apr. 8, 2014

(54) DISPLAY

(75) Inventor: Friedrich-Josef Sacher, Troisdorf (DE)

(73) Assignee: Aspre AG, Appenzell (CH)

( * ) Notice: Subject to any disclaimer, the term of this patent is extended or adjusted under 35 U.S.C. 154(b) by 8 days.

(21) Appl. No.: 13/508,474

(22) PCT Filed: Oct. 25, 2010

(86) PCT No.: PCT/EP2010/006500
§ 371 (c)(1),
(2), (4) Date: Sep. 10, 2012

(87) PCT Pub. No.: WO2011/054456
PCT Pub. Date: May 12, 2011

(65) Prior Publication Data
US 2012/0327500 A1    Dec. 27, 2012

(30) Foreign Application Priority Data
Nov. 9, 2009   (DE) .......................... 10 2009 052 271

(51) Int. Cl.
*G02B 26/02*    (2006.01)
(52) U.S. Cl.
USPC ......................................................... 359/228
(58) Field of Classification Search
USPC ............ 359/228, 237, 238, 290, 665; 40/406, 40/407, 466, 477; 406/106; 446/267
See application file for complete search history.

(56) References Cited

U.S. PATENT DOCUMENTS

| | | | |
|---|---|---|---|
| 6,473,543 B2* | 10/2002 | Bartels | 385/16 |
| 8,087,191 B2* | 1/2012 | Bartels et al. | 40/406 |
| 2010/0253993 A1 | 10/2010 | Sacher | |

FOREIGN PATENT DOCUMENTS

| | | |
|---|---|---|
| DE | 10 2006 009 541 A1 | 8/2007 |
| DE | 10 2006 050 404 A1 | 4/2008 |
| EP | 1 090 384 B1 | 4/2002 |
| EP | 1 529 274 B1 | 10/2006 |
| WO | WO 00/00947 | 1/2000 |
| WO | WO 2004/021318 A1 | 3/2004 |

* cited by examiner

*Primary Examiner* — Tuyen Tra
(74) *Attorney, Agent, or Firm* — Muirhead and Saturnelli, LLC

(57) ABSTRACT

A display includes at least one electronically controllable pixel which has at least one color level which is formed by a flat container, the interior of which is connected to a color reservoir. The content of the color reservoir can be pressurized by electronic control of an actuating drive, which acts on a movable wall of the color reservoir in such a way that colorant liquid moves from the color reservoir into the color level, and, by reducing the pressure in the color reservoir, the colored liquid is transported back into the color reservoir and a transparent fluid moves into the color level. A wall of the color reservoir faces away from the color level and at least partially forms the movable wall. An actuator of the actuating drive causes the displacement of the movable wall and moves in a plane parallel to the plane of the color reservoir.

19 Claims, 3 Drawing Sheets

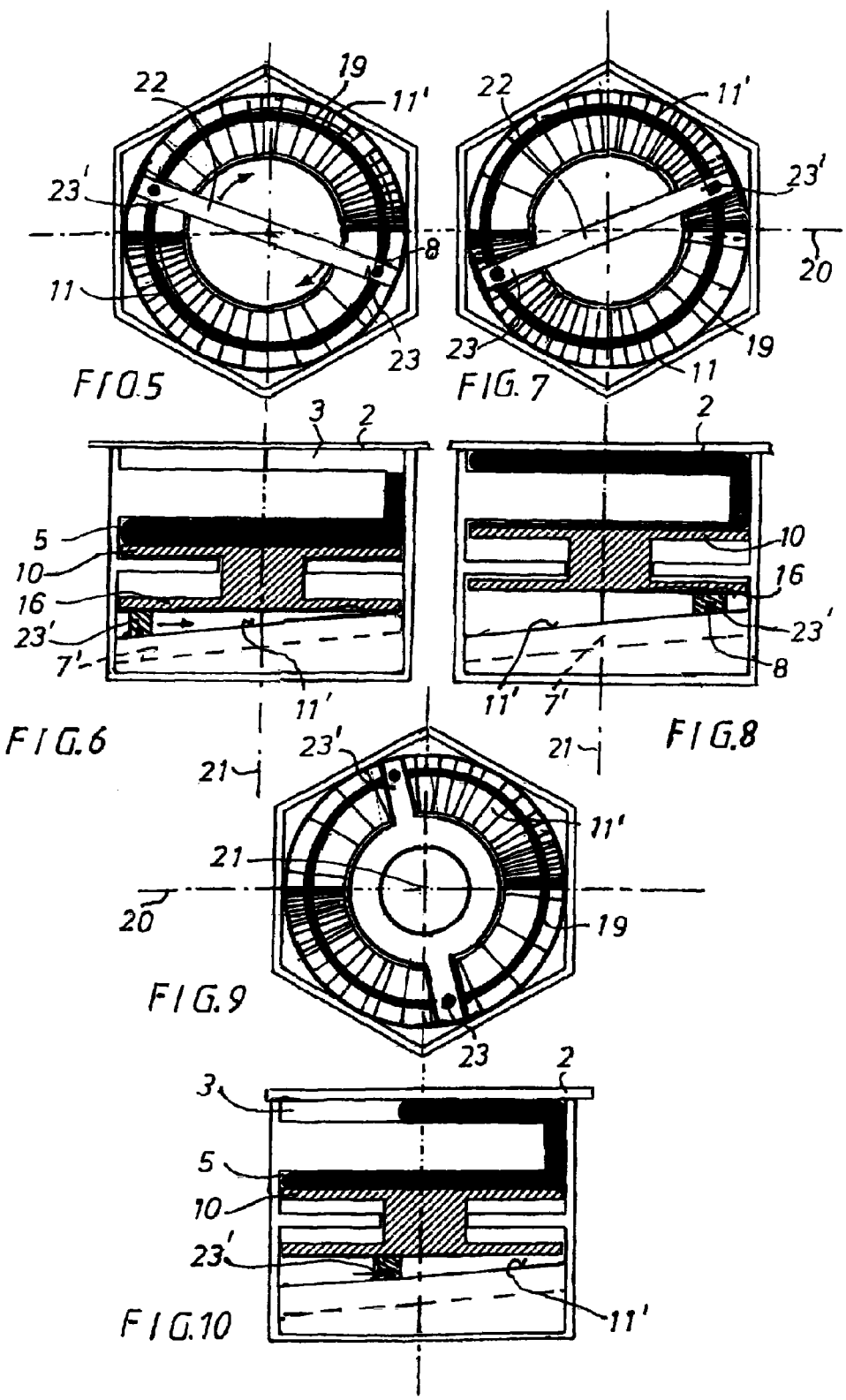

DISPLAY

TECHNICAL FIELD

This application relates to a display having an image area, which is composed of electronically controllable pixels situated in a raster-like pattern and in which each pixel has at least one color level, which is formed by a flat container, which is clear and transparent at least on the visible side and whose interior is connected to a color reservoir, whose content may, by electronic control of an actuating drive, which acts on the movable wall of the color reservoir, be placed under pressure so that colored liquid from the color reservoir reaches the color level, and, by reducing the pressure in the color reservoir, the colored liquid is transported back from the color level into the color reservoir and a clear, transparent liquid or gaseous fluid reaches the color level.

BACKGROUND OF THE INVENTION

Displays of this type are known from EP 1 529 274 and EP 1 090 384. In these known displays, piezo actuators are used as the actuating drives, which move the movable walls like a micropump and thus press colored liquid into the color levels or move a clear, transparent, and colorless fluid into the color levels. Magnets may also be used as the actuating drives. The known displays have the disadvantage that their actuating drives are not controllable or are only controllable with difficulty during a control and are therefore not suitable for filling the color levels with colored liquid by one-half, one-third, one-fourth, or another fraction. The partial filling of the color levels with colored liquids of the colors red, green, blue or cyan, magenta, yellow is necessary to achieve as many finely graduated color tones as possible of the pixels.

Furthermore, transporting the colored liquid from the color reservoir into the color level and out of the color level into the color reservoir with the aid of so-called electro-wetting technology is known. Multiple layers must be applied to the transparent wall, in particular an electrode layer and an insulating layer. A fluid layer, which is composed of two liquids which are not miscible with one another, e.g., an oily colored liquid and colorless water, is typically moved using the electro-wetting technology so that a clear, transparent, colorless liquid or a colored liquid is transported into the color levels of a pixel.

These electrodes and layers are applied as ultrathin, transparent layers, but nonetheless these layers obstruct the passage of light, because light beams are deflected and refracted on the edges of these layers. Scattered light partially results, so that the light transparency of the walls of the color levels which are coated to provide the required electrodes is not optically pure. This interferes in particular if three or four color levels of a pixel are situated one behind another. The partial filling of the color levels with colored liquid with the aid of the electro-wetting technology is also only possible with great expenditure and not with the desired rapidity.

Accordingly, it would be desirable to provide an actuating drive for a micropump or the movable wall of the color reservoir, which may be controlled in such a way that precise intermediate positions are also possible.

SUMMARY OF THE INVENTION

According to the system described herein, a display is provided having a color reservoir that is flat and extends parallel to a color level and a wall of the color reservoir facing away from the color level at least partially forms the movable wall, and an actuating drive is formed by at least one micro-linear drive, whose actuator, which causes the displacement of the movable wall, moves in a plane parallel to the plane of the color reservoir and the movable wall is supported on the actuator via a surface extending at an acute angle to the plane of the color reservoir, and thus the movement of the actuator is converted into a shortened lifting or lowering movement, which extends perpendicularly thereto, of the movable wall.

This surface, which extends at an acute angle to the plane of the color reservoir and therefore also to the movable wall, may be directly or indirectly connected via a lifting plate to the movable wall and the actuator may be designed as a pin-shaped projection, whose end facing toward the sliding surface slides along the sliding surface upon displacement of the actuator and therefore presses the movable wall of the color reservoir more deeply into the color reservoir and therefore presses color into the color level. If the actuator moves in the opposite direction, the movable wall is pressed back by a restoring spring. The volume in the color reservoir is thereby enlarged, so that colored liquid is suctioned out of the color level. The colored liquid may also be pressed back into the color reservoir by a compressed air or gas bubble or also electromagnetically.

In a kinematic reversal, the actuator causing the displacement of the movable wall of the color reservoir, or a part connected to this actuator, on which the wall is supported, may also be moved along a path extending at the acute angle to the plane of the color reservoir, so that this movement of the actuator is converted into a shortened lifting or lowering movement, which extends perpendicularly to the plane of the color reservoir, of the movable wall.

All micro-linear drives, whose actuator is precisely positionable to ultra-small steps and may move the movable wall of the color reservoir into the programmed position with sufficient force and speed, are suitable for the drive of the actuator, i.e., in particular piezo linear motors, piezo linear actuators, and ultrasonic motors.

The actuator of the linear drive is advantageously connected to a carriage, on which the movable wall of the color reservoir is supported and which has a sliding surface parallel to the plane of the color reservoir and a sliding surface extending at an acute angle thereto. This carriage is situated between the plane extending parallel to the plane of the color reservoir and the surface extending at an acute angle thereto and causes better distribution of the forces and reduces the force torques to be absorbed by the guide of the movable wall of the color reservoir.

If the displacement force of a micro-linear drive is insufficient, two drives may be provided, whose actuators act in opposing directions on the ends of a rotating bridge, which raises or lowers the movable wall by the maximum lift upon rotation by less than 180°.

BRIEF DESCRIPTION OF THE DRAWINGS

Exemplary embodiments of the system described herein are described in greater detail in the following description with reference to the drawings. In the drawings, FIG. 5 shows a top view of an actuating drive having two micro-linear drives and two inclined surfaces, FIG. 6 shows a sectional view of a pixel in a position of the actuating drive according to FIG. 5 and with a colorless color level, FIG. 7 shows a top view of an actuating drive according to FIG. 5, but in a completely filled position, FIG. 8 shows a sectional view of a pixel corresponding to FIG. 6 having a color level completely filled with colored liquid, FIG. 9 shows a top view of an actuating drive according to FIG. 5 in a position in which the color level is half-filled with colored liquid, FIG. 10 shows a sectional view of the pixel corresponding to FIG. 6 having a color level which is half-filled with colored liquid.

DETAILED DESCRIPTION OF VARIOUS EMBODIMENTS

Figure 1:
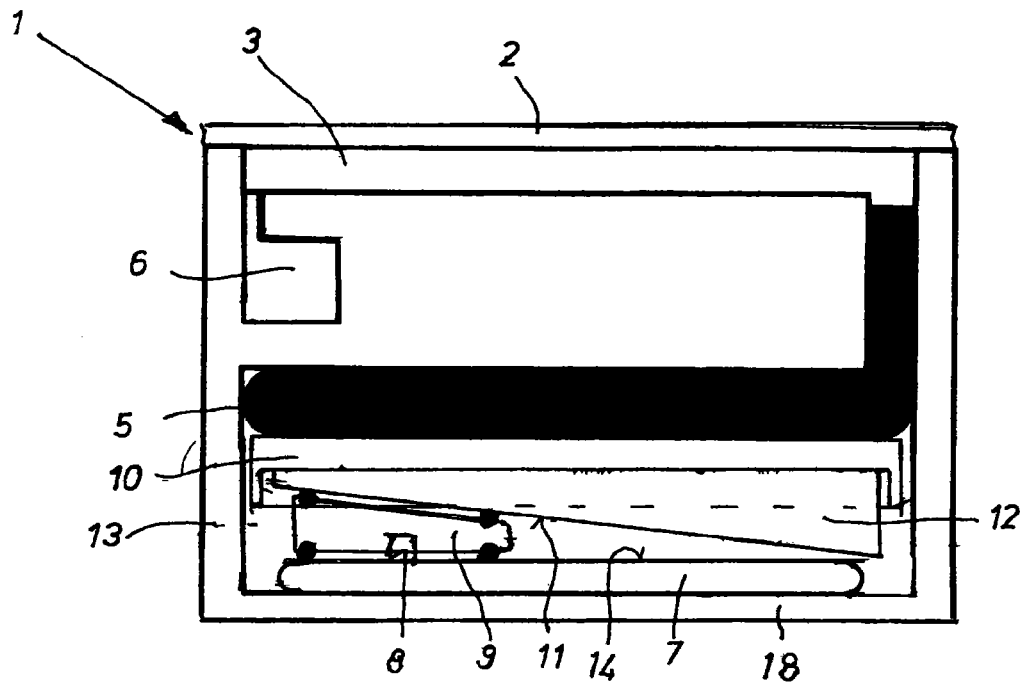
FIG. 1 shows a sectional view of a pixel whose color level is colorless.
Figure 2:
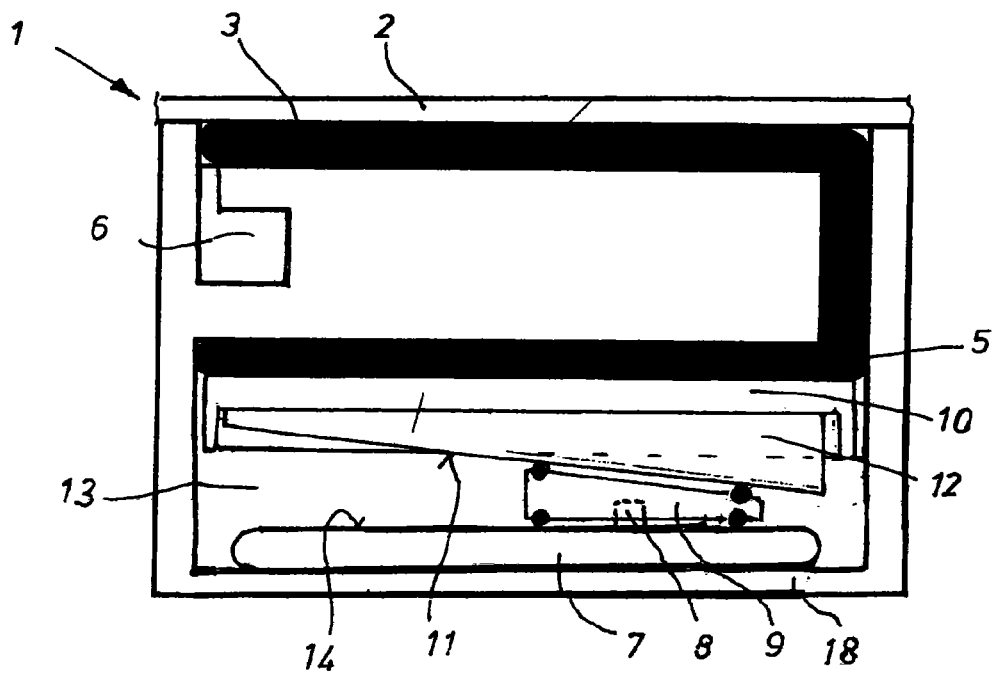
FIG. 2 shows a sectional view of a pixel whose color level is filled with colored liquid.

FIGS. 1 and 2 show a pixel 1, whose color level 3 is formed by a flat container, which has a clear transparent wall 2 on the visible side. If multiple color levels 3 are arranged one behind another, both walls of the front color levels 3 extending parallel to the image area must be clear and transparent. The interior of color level 3 is connected via a channel 4 to a color reservoir 5, which has a movable wall 10, using which the content of the color reservoir 5 may be placed under pressure in such a way that colored liquid reaches color level 3 from color reservoir 5. In FIG. 1, air, gas, or a colorless liquid is located in color level 3, while the colored liquid is located in color reservoir 5 and in channel 4.

The transport of the colored liquid from color reservoir 5 into color level 3 and from there back into color reservoir 5 is caused by an electronically controlled actuating drive, which has a micro-linear drive 7, whose actuator 8, which, in the event of control of the linear drive 7, causes the displacement of movable wall 10, slides directly or indirectly via a carriage 9 along a surface 11, which is connected to movable wall 10 and extends at an acute angle to the plane of color reservoir 5. Actuator 8 is in the left starting position in FIG. 1. Upon control of linear drive 7, actuator 8 moves to the right, whereby colored liquid is pressed into color level 3. The air located in color level 3 is pressed into gas space 6 and compressed. If actuator 8 is moved from right to left by linear motor 7, the compressed air presses the colored liquid located in color level 3 back into color reservoir 5. Movable wall 10 of color reservoir 5 may also be reset into the starting position via restoring springs, so that a partial vacuum and therefore a suction result in color reservoir 5, which moves colored liquid back into color reservoir 5.

Figure 3:
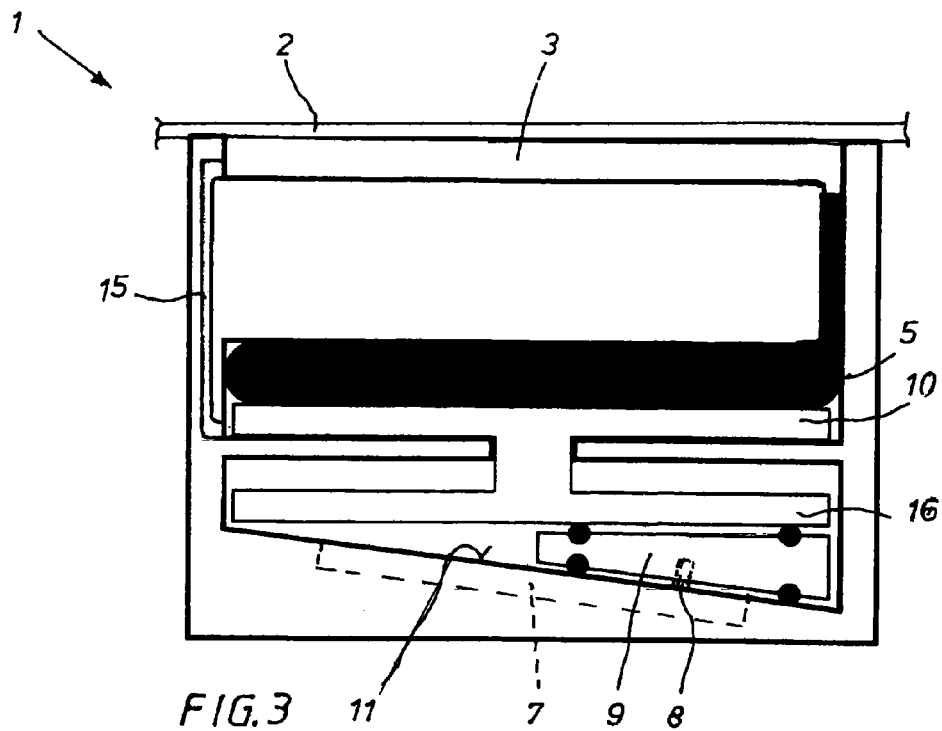
FIG. 3 shows a sectional view of a pixel having a lift plate between the movable wall of the color reservoir and the actuating drive, whose color level is colorless.
Figure 4:
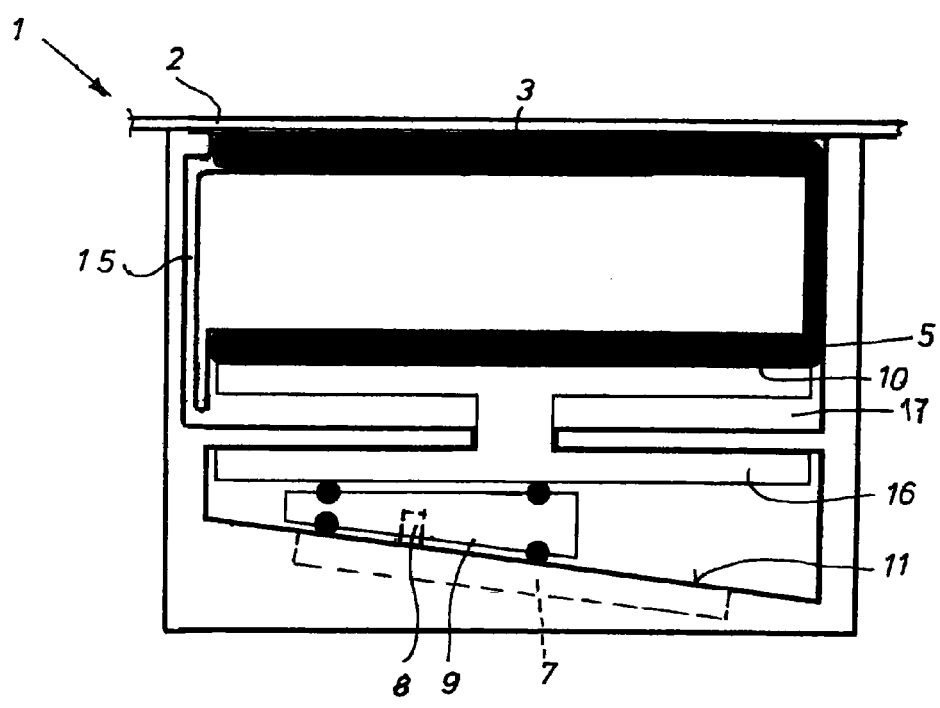
FIG. 4 shows a sectional view of a pixel corresponding to FIG. 3, whose color level is filled with colored liquid.

In FIGS. 1 and 2, actuator 8 moves parallel to movable wall 10 and sliding surface 11 extending at an acute angle to movable wall 10 is connected to movable wall 10. In the exemplary embodiment shown in FIGS. 3 and 4, in a kinematic reversal, sliding surface 11 extending at an acute angle is situated to be stationary, and actuator 8 moves at the acute angle to movable wall 10. Furthermore, in this embodiment color level 3 is connected via a channel 15 to space 17 behind movable wall 10, so that upon filling of the color level with colored liquid, the colorless, clear, transparent fluid displaced from color level 3 reaches space 17 behind movable wall 10 of color reservoir 5. This space 17 becomes larger the more colored liquid is pressed into color level 3.

The acute angle between the plane of color reservoir 5 and inclined surface 11 is a function of the ratio of the maximum displacement path of actuator 8 and the maximum lift of movable wall 10 of the color reservoir 5. For example, if the maximum displacement path of the actuator is 0.4 mm and the maximum lift of the movable wall is 0.1 mm to 0.25 mm, the acute angle is 15° to 20°.

In the specific embodiments of the system described herein according to FIGS. 1 through 4, movable wall 10 must be guided during its lifting and lowering movement so that it absorbs the torque which is exerted by actuator 8 or by carriage 9 on movable wall 10. This guiding may also be assumed by a lifting plate 16, which is fixedly connected to movable wall 10.

Movable wall 10 of color reservoir 5 may be formed by a diaphragm (not shown), which closes color reservoir 5.

In pixel 1 according to FIGS. 5 through 10, a micro-linear drive 7, 7' and a sliding surface 11, 11', which cooperates with actuator 8 of linear drive 7, 7' and extends at an acute angle to the plane of color reservoir 5, are situated symmetrically in each case on both sides of a center line 20 of pixel 1. In FIGS. 5, 7, and 9, micro-linear drives 7 and 7' are located below the diagonally extending sliding surfaces 11 and 11'. These sliding surfaces 11, 11' are inclined at the same acute angle but in opposite directions. Linear drives 7, 7' and also the movement path of actuators 8, 8' are curved in a semicircle having an equal radius around center axis 21 of pixel 1. Micro-linear drives 7, 7' and movement path 19 of actuators 8 may also be linear. The two ends 23, 23' of a bar 22, which is rotatable around center axis 21 of pixel 1, slide on the two sliding surfaces 11, 11'. Because sliding surfaces 11, 11' are inclined in opposite directions, ends 23, 23' of bar 22 are always at the same height.

In FIGS. 5 and 6, a position of bar 22 is shown in which ends 23, 23' are located close to the starting position and bar 22 is moved clockwise by actuators 8, 8'. Air or a colorless, transparent liquid is located in color level 3. When bar 22 has rotated by approximately 140°, the position shown in FIGS. 7 and 8 is reached, in which the two ends 23, 23' of bar 22 are located close to the upper end of slideways 11, 11' and color level 3 is filled with colored liquid. FIGS. 9 and 10 show a position of bridge 22 and its ends 23, 23' in which color level 3 is only half-filled with colored liquid.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A display having an image area, comprising:
electronically controllable pixels situated in a raster-like pattern, wherein each pixel has at least one color level including a flat container, the flat container being clear and transparent at least one visible side and having an interior connected to a color reservoir; and
an actuating device, wherein a pressure of content of the color reservoir is controllable by electronic control of the actuating device, which acts on a movable wall of the color reservoir, wherein, when the content is placed under pressure, colored liquid reaches the color level from the color reservoir, displaces a clear, transparent liquid or gaseous medium which reaches a gas space or a space behind the movable wall via a channel, and, when pressure is reduced in the color reservoir, the colored liquid is transported back into the color reservoir from the color level and the clear, transparent liquid or gaseous medium reaches the color level, the color reservoir being flat and extending parallel to the color level, and wherein the actuating device includes at least one linear drive, wherein an actuator of the linear drive causes the displacement of the movable wall and moves in a plane parallel to the plane of the color reservoir, wherein a wall of the color reservoir facing away from the color level at least partially forms the movable wall, and wherein the movable wall is supported via a sliding surface on the actuator or a part connected thereto, so that the movement of the actuator is converted into a shortened lifting or lowering movement of the movable wall extending perpendicularly thereto.

2. The display as recited in claim 1, wherein the actuator of the linear drive is connected to a carriage, on which the movable wall of the color reservoir is supported and which has a sliding plane parallel to the plane of the color reservoir and a sliding plane parallel to the inclined surface.

3. The display as recited in claim 1, wherein the movable wall of the color reservoir is a diaphragm.

4. The display as recited in claim 1, wherein the movable wall of the color reservoir is displaced under an action of a restoring spring.

5. The display as recited in claim 1, wherein the movable wall is electromagnetically returnable into the starting position.

6. The display as recited in claim 1, wherein the linear drive and a surface, which cooperates with the actuator of the linear drive and extends at an acute angle to the plane of the color reservoir, are inclined symmetrically in each case on both sides of a center line of at least one of the pixels at the same acute angle but in opposite directions, and wherein actuators of the of two linear drives move a bar that is rotatable around the center axis of the at least one pixel and the color level, wherein two ends of the bar are supported on two inclined surfaces, and wherein at least one of the two inclined surfaces is raised or lowered upon rotation of the bar around the center axis and carries along the movable wall of the color reservoir.

7. The display as recited in claim 6 wherein the ends of the bar are carriages having a sliding plane parallel to the plane of the color reservoir and a sliding plane parallel to the inclined surfaces.

8. The display as recited in claim 6, wherein the linear drives and the path of the actuators are linear.

9. The display as recited in claim 6, wherein the linear drives, the path of the actuators, and the inclined surfaces are curved with equal radius around the center axis of the at least one pixel.

10. A display having an image area, comprising:
electronically controllable pixels situated in a raster-like pattern, wherein each pixel has at least one color level including a flat container, the flat container being clear and transparent on at least one visible side and having an interior connected to a color reservoir; and
an actuating device, wherein a pressure of content of the color reservoir is controllable by electronic control of the actuating device, which acts on a movable wall of the color reservoir, wherein, when the content is placed under pressure, colored liquid reaches the color level from the color reservoir and displaces a clear, transparent liquid or gaseous medium, which reaches a gas space or a space behind the movable wall via a channel, and, when the pressure is reduced in the color reservoir, the colored liquid is transported back into the color reservoir from the color level and the clear, transparent liquid or gaseous fluid reaches the color level, the color reservoir being flat and extending parallel to the color level and the actuating device including least one linear drive, wherein a wall facing away from the color level at least partially forms the movable wall, and wherein an actuator of the actuating device, which causes displacement of the movable wall, moves in an inclined surface extending at an acute angle to the plane of the color reservoir, and wherein the movable wall of the color reservoir is supported directly on the actuator or on a part connected to the actuator, so that the movement of the actuator along the inclined surface is converted into a shortened lifting or lowering movement of the movable wall extending perpendicularly to the plane of the color reservoir.

11. The display as recited in claim 10, wherein the actuator of the linear drive is connected to a carriage, on which the movable wall of the color reservoir is supported and which has a sliding plane parallel to the plane of the color reservoir and a sliding plane parallel to the inclined surface.

12. The display as recited in claim 10, wherein the movable wall of the color reservoir is a diaphragm.

13. The display as recited in claim 10, wherein the movable wall of the color reservoir is displaced under an action of a restoring spring.

14. The display as recited in claim 10, wherein the movable wall is electromagnetically returnable into the starting position.

15. The display as recited in claim 10, wherein the linear drive and a surface, which cooperates with the actuator of the linear drive and extends at an acute angle to the plane of the color reservoir, are inclined symmetrically in each case on both sides of a center line of at least one of the pixels at the same acute angle but in opposite directions, and wherein actuators of two linear drives move a bar that is rotatable around the center axis of the at least one pixel and the color level, wherein two ends of the bar are supported on two inclined surfaces, and wherein at least one of the two inclined surfaces is raised or lowered upon rotation of the bar around the center axis and carries along the movable wall of the color reservoir.

16. The display as recited in claim 15, wherein the ends of the bar are carriages having a sliding plane parallel to the plane of the color reservoir and a sliding plane parallel to the inclined surfaces.

17. The display as recited in claim 15, wherein the linear drives and the path of the actuators are linear.

18. The display as recited in claim 15, wherein the linear drives, the path of the actuators, and the inclined surfaces are curved with equal radius around the center axis of the at least one pixel.

19. A display having an image area, comprising:
at least one electronically controllable pixel having at least one color level including a flat container having an interior connected to a color reservoir; and
an actuating device, wherein a pressure of content of the color reservoir is controllable by electronic control of the actuating device, which acts on a movable wall of the color reservoir, wherein, when the content is placed under pressure, colored liquid reaches the color level from the color reservoir and displaces a liquid or gaseous medium, and, when the pressure is reduced in the color reservoir, the colored liquid is transported back into the color reservoir from the color level and the liquid or gaseous medium reaches the color level, the color reservoir being flat and extending parallel to the color level and the actuating device including least one linear drive, wherein a wall of the color reservoir facing away from the color level at least partially forms the movable wall, wherein an actuator of the actuating device causes displacement of the movable wall, and wherein the movable wall of the color reservoir is supported directly on the actuator or on a part connected to the actuator.

* * * * *

UNITED STATES PATENT AND TRADEMARK OFFICE
CERTIFICATE OF CORRECTION

| | |
|---|---|
| PATENT NO. | : 8,693,077 B2 |
| APPLICATION NO. | : 13/508474 |
| DATED | : April 8, 2014 |
| INVENTOR(S) | : Friedrich-Josef Sacher |

It is certified that error appears in the above-identified patent and that said Letters Patent is hereby corrected as shown below:

In the Claims:

<u>Col. 4, line 52:</u>

In Claim 1, the phrase "and transparent at least one visible side" should read
-- and transparent on at least one visible side --

Signed and Sealed this
Twenty-second Day of July, 2014

Michelle K. Lee
*Deputy Director of the United States Patent and Trademark Office*